United States Patent Office 3,740,442
Patented June 19, 1973

3,740,442
2-ISOPROPYLAMINOBENZOPHENONES IN TREATING INFLAMMATION
Hans Ott, Pfeffingen, Basel-Land, Switzerland, assignor to Sandoz-Wander, Inc., Hanover, N.J.
No Drawing. Continuation of application Ser. No. 787,253, Dec. 26, 1968, which is a continuation-in-part of application Ser. No. 741,804, July 1, 1968, which is a continuation-in-part of application Ser. No. 707,932, Feb. 26, 1968, which in turn is a continuation-in-part of application Ser. No. 672,739, Oct. 4, 1967, all now abandoned. This application Jan. 14, 1972, Ser. No. 217,941
Int. Cl. A61k 27/00
U.S. Cl. 424—330      2 Claims

ABSTRACT OF THE DISCLOSURE

Disclosed are 2-isopropylaminobenzophenones having pharmaceutical activity in animals and useful, for example, as anti-inflammatory agents.

---

This application is a continuation of copending application Ser. No. 787,253, filed Dec. 26, 1968, which is a continuation-in-part of application Ser. No. 741,804, filed July 1, 1968, which is a continuation-in-part of application Ser. No. 707,932, filed Feb. 26, 1968, which is a continuation-in-part of application Ser. No. 672,739, filed Oct. 4, 1967 all are now abondoned.

The invention relates to novel 2-isopropylaminobenzophenones having the structural Formula I:

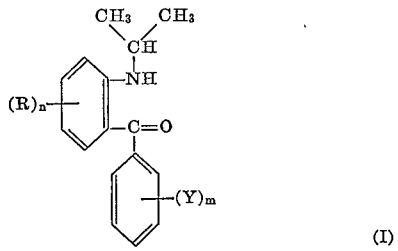

wherein

R represents halo having an atomic weight no greater than 36, i.e., fluoro and chloro; lower alkyl, preferably having from 1 to 3 carbon atoms, e.g., methyl; or lower alkoxy, preferably containing from 1 to 2 carbon atoms;

n represents 0, 1 or 2; and when n is 2 then R is the same or different.

Y represents halo of atomic weight no greater than 36; lower alkyl, preferably containing from 1 to 3 carbon atoms; or lower alkoxy, preferably containing from 1 to 2 carbon atoms; and m is 0, 1 or 2, and when 2 then m is the same or different.

The 2-isopropylaminobenzophenones of Formula I are preferably prepared by a Procedure A involving reaction of a 2-aminobenzophenone of Formula II:

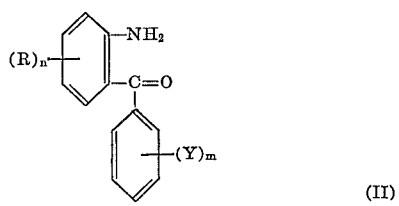

wherein R, n, Y and m are as defined, with an isopropyl halide of Formula III:

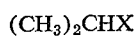      (III)

wherein X is bromo or iodo.

The preparation of compounds I by Procedure A involves reacting an o-aminobenzophenone of Formula II with isopropyl halide of Formula III, preferably isopropyl iodide. Desirably, the reaction is carried out in the presence of an inorganic base, e.g., an alkali metal carbonate such as sodium carbonate, to take up the hydrogen halide liberated during the reaction. If desired, the reaction may be carried out in any suitable inert organic solvent, e.g., dioxane, benzene and toluene. However, the use of a solvent is not necessary since an excess of the isopropyl halide can be utilized for this purpose. The reaction is most conveniently effected at elevated temperatures. Desirably, the reaction is carried out at elevated temperatures typically from about 60° to about 100° C. Preferably, the reaction is conducted at the reflux temperature of the system. However, the particular temperature employed is not critical and somewhat lower temperatures or higher temperatures and elevated pressures can be employed.

It should be noted that the reaction of Procedure A proceeds independently of the particular substituents attached to the phenyl rings. Accordingly, while the process is specifically exemplified with respect to certain substituents attached to either or both of the phenyl rings, it nevertheless can be utilized for the preparation of all of the compounds included within the scope of the invention.

Various of the 2-aminobenzophenones of Formula II employed as starting materials in Procedure A are known and can be prepared as described in the literature. Such others which may not be specifically described in the literature can be readily prepared from known materials in analogous manner.

The 2-isopropylaminobenzophenones of this invention are useful because they possess pharmacological activity in animals. In particular, such compounds are useful as anti-inflammatory agents as indicated by the carrageenan-induced edema test on rats, and the antagonism of bradykinin-induced broncho-constriction of the guinea pig. For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For the above-mentioned use, the dosage administered will, of course, vary depending up the compound used and mode of administration. However, in general, satisfactory results are obtained when administered at a daily dosage of from about 8 milligrams to about 200 milligrams per kilogram of body weight, preferably given in divided doses 2 to 4 times a day, or in sustained release form. For most mammals, the administration of from about 500 milligrams to about 10,000 mg. of the compound per day provides satisfactory results and dosage forms suitable for internal administration comprise from about 125 milligrams to about 5,000 milligrams of the compound in admixture with a solid or liquid pharmaceutical carrier or diluent. A representative formulation is a tablet prepared by conventional tabletting techniques and containing, by weight, 50 parts of 4-methyl-2-isopropylaminobenzophenone, 2 parts of tragacanth, 39.5 parts of lactose, 5 parts of corn starch, 3 parts of talcum and 0.5 part of magnesium stearate.

From a biological activity standpoint the 2-isopropylaminobenzophenones also exhibit a marked antibradykinin activity as demonstrated on intravenous administration to the guinea pig, for example, in doses of from 150 to 5,000 micrograms per kilogram of body weight.

The following examples illustrate the preparation of representative compounds of this invention. However, it is to be understood that the examples are for purposes of illustration only and are not intended as in any way limiting the scope of the invention.

EXAMPLE 1 o-Isopropylaminobenzophenone

A mixture of 20 g. of o-aminobenzophenone, 10 g. of sodium carbonate and 50 ml. of isopropyl iodide is refluxed with stirring for 5 days. The excess isopropyl iodide is then evaporated off in vacuo, and the resulting residue extracted with 200 ml. of benzene. The benzene extract is then filtered, washed twice with 100 ml. (each) of water, dried over anhydrous sodium sulfate, filtered and evaporated to dryness in vacuo to obtain o-isopropylaminobenzophenone as an oil.

EXAMPLE 2

5-chloro-2-isopropylaminobenzophenone

A mixture of 10 g. of 5-chloro-2-aminobenzophenone, 5 g. of sodium carbonate and 30 ml. of isopropyl iodide is refluxed with stirring for 2½ days. The excess isopropyl iodide is then evaporated off in vacuo and the resulting residue extracted with 200 ml. of benzene. The benzene extract is then filtered, washed twice with 100 ml. (each) of water, dried over anhydrous sodium sulfate, filtered and evaporated to dryness in vacuo to obtain 5-chloro-2-isopropylaminobenzophenone as an oil.

EXAMPLE 3

2-isopropylamino-4'-methylbenzophenone

A mixture of 5 g. of 2-amino-4'-methylbenzophenone, 5 g. of sodium carbonate and 20 ml. of isopropyl iodide is refluxed with stirring for 5 days. The excess isopropyl iodide is then evaporated off in vacuo and the resulting residue extrated with 200 ml. of benzene. The benzene extract is then filtered, washed twice with 100 ml. (each) of water, dried over anhydrous sodium sulfate, filtered and evaporated to dryness in vacuo to obtain 2-isopropylamino-4'-methylbenzophenone as an oil.

EXAMPLE 4

4,5-dimethyl-2-isopropylaminobenzophenone

A mixture of 9.5 g. of 2-amino-4,5-dimethylbenzophenone, 5 g. of sodium carbonate and 30 ml. of isopropyl iodide is refluxed with stirring for 20 hours. The excess isopropyl iodide is then evaporated off in vacuo and the resulting residue extracted with 200 ml. of benzene. The benzene extract is then filtered, washed twice with 100 ml. (each) of water, dried over anhydrous sodium sulfate, filtered and evaporated to dryness in vacuo to obtain 4,5-dimethyl-2-isopropylaminobenzophenone as an oil which is further purified chromatographically on an aluminum oxide column.

EXAMPLE 5

4-methyl-2-isopropylaminobenzophenone

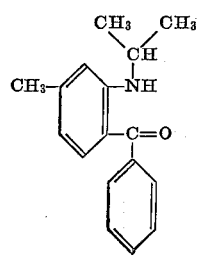

A mixture of 7 g. of 4-methyl-2-aminobenzophenone, 6.35 g. of sodium carbonate and 18.8 ml. of 2-iodopropane is stirred and refluxed for 3 days. The cooled reaction mixture is then diluted with 200 ml. of benzene and washed twice with water and twice with brine. The organic phase is separated, dried over anhydrous sodium sulfate and concentrated in vacuo to remove substantially all of the benzene. The resulting yellow oil is dissolved in about 10 ml. of methylene chloride and subjected to column chromatography employing alumina (about 400 g.) and methylene chloride as eluant to give a first fraction which on concentration in vacuo to remove methylene chloride produced a yellow oil of 4-methyl-2-isopropylaminobenzophenone.

EXAMPLE 6

4-methoxy-2-isopropylaminobenzophenone

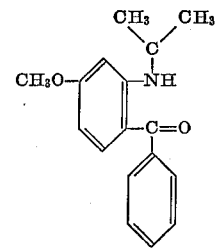

A mixture of 9 g. of 2-amino-4-methoxybenzophenone, 15 g. of anhydrous potassium carbonate and 40 ml. of 2-iodopropane is refluxed for 4 days. The cooled reaction mixture is then diluted with 200 ml. of benzene and washed twice with water and twice with brine. The organic phase is separated, dried over anhydrous sodium sulfate and concentrated in vacuo to remove substantially all of the benzene. The resulting oil is dissolved in about 10 ml. of methylene chloride and subjected to column chromatography employing alumina (about 400 g.) and methylene chloride as eluant to give a first fraction which on concentration in vacuo to remove methylene chloride produced an oil of 4 - methoxy-2-isopropylaminobenzophenone.

EXAMPLE 7

4,6-dimethyl-2-isopropylaminobenzophenone

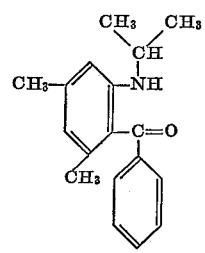

A mixture of 5 g. of 2-amino-4,6-dimethylbenzophenone (prepared by reactions known from E. Ritchie, J. Proc. Roy. Soc. N.S. Wales, 80, 33 (1946) and Chem. Abstracts, 41, 3094(c) (1947)), 5 g. of anhydrous potassium carbonate and 20 ml. of 2-iodopropane is refluxed for 30 hours. The cooled reaction mixture is then diluted with 200 ml. of benzene and washed twice with water and twice with brine. The organic phase is separated, dried over anhydrous sodium sulfate and concentrated in vacuo to remove substantially all of the benzene. The resulting oil is dissolved in about 10 ml. of methylene chloride. The resulting solution is diluted with pentane and concentrated in vacuo to crystallize 4,6-dimethyl-2-isopropylaminobenzophenone; M.P. 87°–88° C.

What is claimed is:
1. The method of treating inflammation in an animal comprising administering to an animal an inflammation relieving amount of a compound of the formula

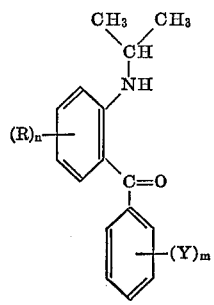

wherein
R represents halo, lower alkyl, or lower alkoxy;
n represents 0, 1 or 2; and when 2, then R is the same or different;
Y represents halo, lower alkyl or lower alkoxy; and
m is 0, 1 or 2, and when 2, then m is the same or different.

2. The method of claim 1 in which the compound is 4-methyl-2-isopropylaminobenzophenone.

No references cited.

STANLEY J. FRIEDMAN, Primary Examiner